March 27, 1945.  A. F. HOPPE  2,372,274
GOVERNOR
Filed April 20, 1942   2 Sheets-Sheet 1

INVENTOR.
ARNOLD F. HOPPE.
BY
ATTORNEYS.

March 27, 1945.  A. F. HOPPE  2,372,274
GOVERNOR
Filed April 20, 1942   2 Sheets-Sheet 2

INVENTOR.
ARNOLD F. HOPPE.
BY
ATTORNEYS.

Patented Mar. 27, 1945

2,372,274

UNITED STATES PATENT OFFICE 2,372,274

GOVERNOR

Arnold F. Hoppe, New Castle, Ind.

Application April 20, 1942, Serial No. 439,684

5 Claims. (Cl. 123—102)

The present invention relates to a governor, primarily intended for controlling the operation of the internal combustion engine driving means of an automotive vehicle. The basic structural feature of the invention is a fluid motor operatively associated with a valve in the intake passage of an engine to control the flow of motive fluid to the engine, the operation of said fluid motor being dominated by valve means shiftable between two extreme positions in response to the operation of means responsive to the speed of an element driven by the engine. Such element may be an engine part, moving in synchronism with the crank shaft of the engine, or it may be a vehicle part, moving in synchronism with the running gear of the vehicle.

The primary object of the invention is to provide a relatively simple mechanism whereby a limit may be automatically placed upon the maximum speed of a vehicle or an engine, without affecting the available power within all speed ranges below the selected maximum. Most governors heretofore applied to automotive vehicles act to cut down the flow of fuel to the engine as the vehicle approaches the predetermined maximum speed. Obviously, such an operation is highly deleterious in the use of a truck, or the like, upon a highway, since the driver may wish to approach a heavy pull at maximum speed, and to maintain maximum fuel feed to his engine throughout the extent of the heavy pull.

The above object obviously requires that the governor mechanism shall act relatively suddenly when the predetermined speed is attained, so that the control may not begin to hunt too soon, and may not permit overrunning of the predetermined speed, nor effect over controlling in either direction. It is a further object of the invention, therefore, to provide a control mechanism which, when the predetermined speed is attained, will act rapidly to cut down the supply of fuel to the engine, but which will act upon the fuel control valve more slowly as the control valve approaches closed position; and which will act slowly upon the control valve as it begins to open, and then act more rapidly as the control valve approaches fully open position.

The last-stated object further guards against jerking of the vehicle as a result of the operation of the control mechanism. When a governor is placed in control of a relatively high-powered but relatively light vehicle, it is very likely to cause a sensible and very annoying jerking operation of the vehicle when the governor acts to close the fuel supply valve or to open the fuel supply valve.

Such a jerking operation, of course, is not only annoying to the operator or passengers of a vehicle, but is obviously detrimental in its effect upon the driving train of the vehicle. A further object of the invention, therefore, is so to operate the governor as to avoid such jerking of the vehicle.

A still further object of the invention is to place the operation of the fluid motor which directly shifts the fuel control valve, under the domination of an electrically actuated valve mechanism, and to control the actuation of that valve mechanism by speed responsive means.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
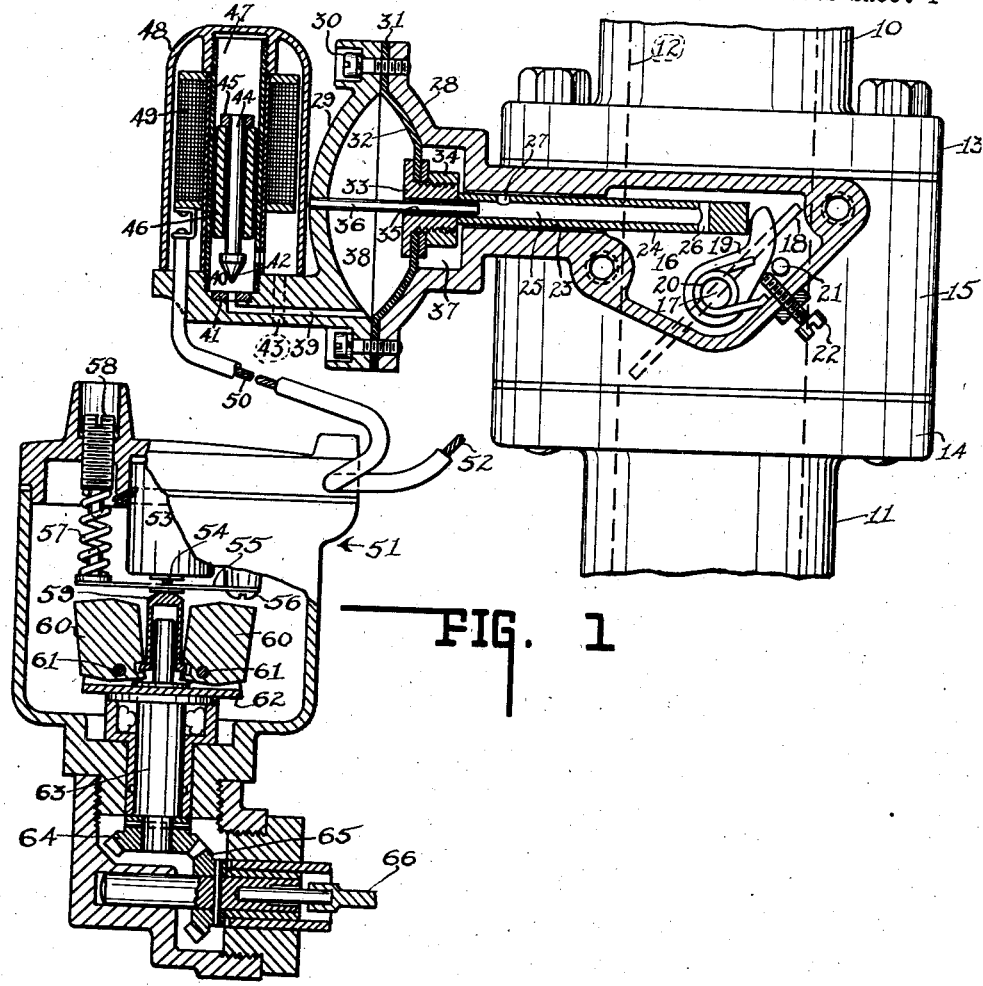
Fig. 1 is a more or less diagrammatic view illustrating a governor as an accessory for association with the fuel feed mechanism of a standard internal combustion engine, parts being shown in section for clarity of illustration.

Referring more particularly to Fig. 1, it will be seen that I have illustrated the discharge neck 10 of the carbureter which may be of standard construction and provided with a flange 13, normally intended for connection to a flange 14 formed on the intake tube 11 leading to the intake manifold of an internal combustion engine of any desired characteristics. A fuel intake passage 12 is formed in said elements 10 and 11; and, in accordance with the present invention, a housing 15, formed to provide a continuation of that passage, is inserted between the flanges 13 and 14. Said housing 15 is formed with a chamber 16, offset from, but communicating with, the passage 12; and a shaft 17 is mounted in said housing 15 to traverse the passage 12, the axis of said shaft 17 perpendicularly intersecting the axis of said passage 12. Fixed to said shaft 17 is a butterfly valve 18 located within the passage 12 and shiftable between substantially the position shown, in which said valve substantially closes the passage 12, and a position in which the valve 18 includes the axis of the passage 12, which is the full open position of said valve.

Of course, in accordance with standard practice, the valve 18 will be so mounted that it can never completely close the passage 12; and therefore, whenever, in the present specification and in the claims appended thereto, reference is made to the closed position of the valve 18, it is to be understood that a position of maximum restriction of flow through the passage 12 is intended.

Secured to the shaft 17 and within the chamber 16 is a finger 19, and a spring 20 is coiled about the shaft 17, bearing at one end against the housing wall and, at its other end, engaging the finger 19 to urge said finger resiliently in a counter-clockwise direction toward full open position of the valve 18. A stop 21 is provided as an absolute limit for the clockwise oscillation of the finger 19; and a set screw 22 is preferably provided as an adjustable stop for limiting the clockwise throw of said finger.

A bore 23 leads outwardly from the chamber 16 and communicates with the interior of a shell element 28. Loosely reciprocably mounted in said bore 23 is a plunger 24 formed with an axial passage 25 therein opening at 26 into the chamber 16. A radial port 27 opens outwardly from the passage 25 at a point adjacent that end of the plunger 24 remote from the chamber 16. At times, the port 27 will be located within the interior of the shell 28. That end of the plunger 24 located within the chamber 16 is operatively associated with the end of the finger 19; and attention is called to the fact that, when the valve 18 is in full open position, the lever arm formed by the finger 19 is substantially perpendicular to the path of movement of the plunger 24.

A mating shell element 29 is secured to the shell element 28 by bolts 30 or the like, said shell elements being formed with annular flanges clamping therebetween the peripheral portion 31 of a flexible diaphragm 32. At its midpoint, said diaphragm is pierced by a stud 33 having an axial port 35 therethrough, said stud being held in place on the diaphragm by a nut 34 threaded upon the projecting end of said stud. The said projecting end of the stud 33 concentrically engages the outer end of the plunger 24, so that the port 35 communicates with the bore 25 of said plunger. A pin 36, carried by the shell 29 slidably projects through the port 35, materially restricting the flow capacity of said port, as compared with the flow capacity of the bore 25 and port 27.

It will be seen that the parts above described make up a fluid motor comprising two variable-volume chambers 37 and 38 separated by a movable wall consisting of the diaphragm 32. It will further be seen that the chamber 37 is in continuous communication with the engine intake passage 12, the chamber 38 is in continuous restricted communication with said passage, while the communication between the chamber 37 and the passage 12 is, at times, restricted when the port 27 moves out of the chamber 37 and into the position illustrated in Fig. 1. In other words, movement of the port 27 into the bore 23 will restrict, without interrupting, communication between the chamber 37 and the passage 12.

A passage 39 leads from the chamber 38 into a compartment 40, the outer end of said passage 39 being surrounded by a valve seat 41 with which may cooperate the head 42 of a valve stem 44. A port 43 provides communication between the compartment 40 and the atmosphere. Thus, when the valve 42 is in the position illustrated in Fig. 1, the chamber 38 is in open communication with the atmosphere.

The valve body 44 is provided with a collar 45 between which and the head 42 is sleeved an armature 46. Preferably, the valve body will be formed of non-magnetizable material, while the armature 46, of course, will be formed of readily magnetizable material, such as soft iron. Preferably the axial extent of the armature 46 will be less than the distance between the valve head 42 and the collar 45 for a reason which will later appear.

The valve assembly is mounted within a tube 47 the lower end of which is threaded into the element 29 in concentricity with the valve seat 41, and the upper end of which threadedly supports a housing 48 for a solenoid coil 49. One terminal of the coil (not shown) is grounded in accordance with standard automotive practice, while the other terminal thereof is connected, by an electrical cable 50, with one terminal of a speed responsive switch mechanism 51, the opposite terminal of which is connected, by cable 52, with a storage battery, or other source of electrical energy (not shown).

The unit 51 comprises a normally open electric switch 53 including an operating plunger 54. When the plunger 54 is forced upwardly, the switch will be closed; and when pressure upon said plunger 54 is removed, the switch will be opened. Of course, closure of the switch 53 will energize the solenoid coil 49.

A leaf spring 55, or other lever-like element, has one end mounted at 56 within the unit 51, and, intermediate its ends, engages the plunger 54. A compression spring 57 engages the opposite end of said element 55, urging the same away from the plunger 54. A screw 58 is provided for adjusting the force exerted by the spring 57 upon said element 55.

Engaging the lower surface of the element 55 substantially in alignment with the plunger 54, is the actuating element 59 of the speed responsive mechanism. A plurality of weights 60, 60, pivoted respectively at 61, 61, are so operatively associated with the element 59 that, as said weights swing outwardly under the influence of centrifugal force, the element 59 will be gradually lifted. The pivotal points 61 are carried on a platform 62 supported upon a shaft 63 suitably journaled in the unit 51 and carrying a beveled gear 64 meshing with a beveled gear 65 likewise journaled in said unit. Means, indicated as an element of a flexible shaft 66, is provided to establish a drive connection between the gear 65 and that element whose speed is to be governored.

It may be noted that, while engine speed control can be effected by connecting the element 66 to any member driven in synchronism with the engine crank shaft, I prefer to connect said element 66 to the timing train of the engine. Likewise, while vehicle speed may be governed by connecting the element 66 to any member driven in synchronism with the running gear of the vehicle, I have found one very satisfactory arrangement is to connect the element 66 to the speedometer drive cable. Alternatively, it would be possible to place the solenoid 49 under the joint domination of a unit 51 driven in synchronism with the engine crank shaft and another similar unit driven in synchronism with the vehicle running gear.

It will be seen that adjustment of the screw 58 will determine the speed of the shaft 63 at which the switch 53 will be closed. As illustrated in Fig. 1, said switch is closed, and the pressure within the chamber 38 is substantially atmospheric pressure, while the pressure within the chamber 37 is substantially intake manifold pressure. In Fig. 1, the valve 18 has just been closed; whereby the speed of the controlled element will be reduced. As the speed of that element drops to a value at which the spring 57 will overcome the effect of the weights 60, the solenoid 49 will be deenergized, and the valve 44 and armature 46 will be dropped, whereby the valve head 42 will be positioned to close the passage 39.

Air is continually being drawn, at a restricted rate, through the port 35 around the pin 36, and thence through the bore 25 and port 26 into the passage 12. Substantially the pressure existing in the passage 12 is being maintained in the chamber 37 by way of the bore 23 in which the plunger 24 fits rather loosely.

At the moment when the valve head 42 closes against the valve seat 41, of course, the pressure within the chamber 38 is much higher than the pressure within the chamber 37, but the effect of the above-described air flow will be gradually to equalize the pressures within the chambers 37 and 38. As the pressure within the chamber 38 approaches the pressure within the chamber 37, the spring 20 will overcome the previously existing pressure differential, and will swing the finger 19 counterclockwise to force the plunger 24 and diaphragm 32 toward the left, thereby swinging the valve 18 toward full open position. The movement of the plunger 24 toward the left will be slow because the effective area of the port 35, as restricted by the pin 36, is very small. The opening movement of the valve 18, however, will be at a continually accelerating rate, because of the relationship between the plunger 24 and the finger 19. That is, since that relationship is such that the valve 18 is in full open position when the effective lever arm of the finger 19 is substantially perpendicular to the path of the plunger 24, a given increment of the movement of the plunger 24, when the finger 19 is in the position illustrated in Fig. 1, will result in an angular movement of the valve 18 much smaller than that produced by the same increment of the movement of the plunger 24 when the valve 18 is close to its full open position.

Consequently, the feed of fuel to the engine is very gradually increased from a minimum, so that the engine may have a chance to take hold and begin to pull, and then is more rapidly increased as the valve 18 approaches full open pos'tion, to supply full power to the engine.

This gradual starting of the opening movement of the valve 18, followed by an increase in rate of movement of the valve is an important feature of the invention. Known characteristics of operation of internal combustion engines are accommodated by this operative feature, since it is well known that, if the throttle valve for such an engine is too suddenly opened at a time when the engine is idling, the engine may choke and stagger as it tries to pick up its load, which may result in "bucking," detrimental in effect not only upon the passengers but upon the parts of the vehicle itself. Observation of the operation of the mechanism indicates that the rate of movement of the diaphragm itself may be somewhat accelerated as the diaphragm nears the left-hand limit of its throw. It is my present belief that such acceleration of the movement of the diaphragm does take place, and that it probably results from the increase of the effective length of the lever arm through which the spring 20 acts upon the plunger 24.

As the valve 18 attains full open position, and assuming that the normal throttle valve (not shown) is also sufficiently wide open to permit the engine to accelerate the speed of the controlled element beyond the predetermined value for which the unit is set, the weights 60 will swing outward to elevate the element 59 to close the switch 53 to reenergize the solenoid 49. Energization of that solenoid will cause the armature 46 to spring upwardly. Of course, during deenergization of the solenoid 49, the armature 46 will rest upon the shoulder formed by the valve head 42. Therefore, as the armature springs upwardly, its first movement will be a movement relative to the valve body 44, so that the armature will strike the collar 45 a dynamic blow. This arrangement, of course, makes more certain the opening of the valve 42; and subsequent movement of the armature 46 will carry the valve body 44 with it, to move the same substantially to the position illustrated in Fig. 1.

As the valve 42 is moved to said position, atmospheric air rushes through the port 43 and the passage 39 into the chamber 38. Since the flow path for such atmospheric air is of considerably greater capacity than the restricted port 35, pressure within the chamber 38 will be rather rapidly increased. At the time of opening of the valve 42, the port 27 will be positioned within the chamber 37. However, as the diaphragm 32 moves toward the right under the influence of the increasing pressure within the chamber 38, the port 27 will be moved into the bore 23, whereby said port is masked to restrict considerably the flow path between the chamber 37 and the passage 12. Such restriction will somewhat increase the pressure differential between opposite ends of the port 35, thereby somewhat increasing the rate of flow of air through said port 35, to decrease the rate at which the pressure within the chamber 38 is built up. As a result, the rate of movement of the diaphragm 32 toward the right will be somewhat reduced. That reduction in the rate of movement of the diaphragm 32, combined with the effect of the changing relationship between the path of movement of the plunger 24 and the lever arm against which that plunger operates upon the shaft 17, as above described, progressively reduces the rate of angular movement of the valve 18 as said valve approaches the illustrated closed position. This effect very materially reduces the tendency of the governor mechanism to produce a jerky action of the engine and vehicle.

Figure 5:
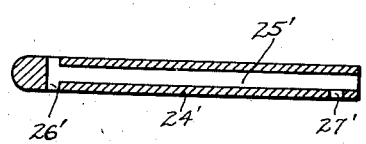
Fig. 5 is a section through a plunger of modified form.

I have found, by experimentation, that varying conditions require variable positions for the port 27 with respect to that end of the plunger engaged by the stud 33. If the governor mechanism is to be used to control a relatively powerful engine in a relatively light vehicle, the port 27 should be so positioned as to be masked rather promptly after opening of the valve 42. As the ratio of power capacity of the engine to load value is reduced, however, the port 27 should be moved closer and closer to the left-hand end of the plunger 24, as viewed in Fig. 1. Fig. 5 illustrates a plunger 24' provided with a bore 25' and a port 26' adapted to be disposed in constant communication with the passage 12, and with a port 27' so disposed that it will never be masked during operation of the governor. I have found that such a plunger is best adapted for use in a governor mounted to control the engine of a heavy truck.

Figure 2:
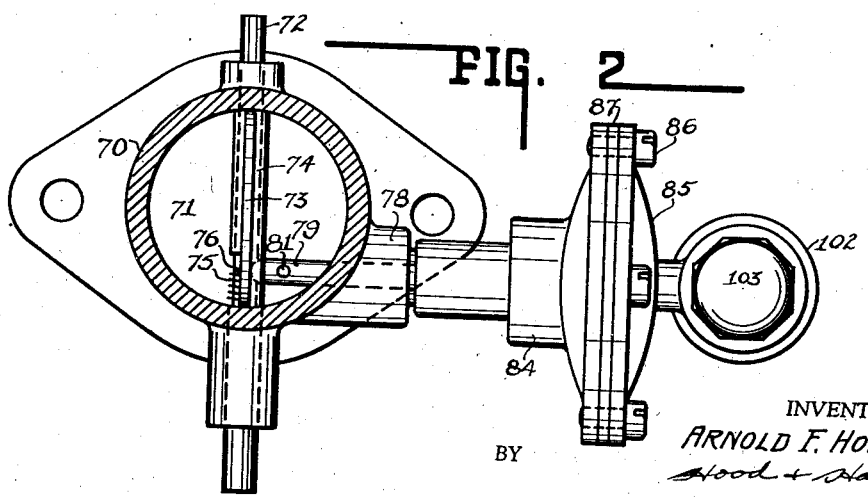
Fig. 2 is a horizontal section through another form of the invention.
Figure 3:
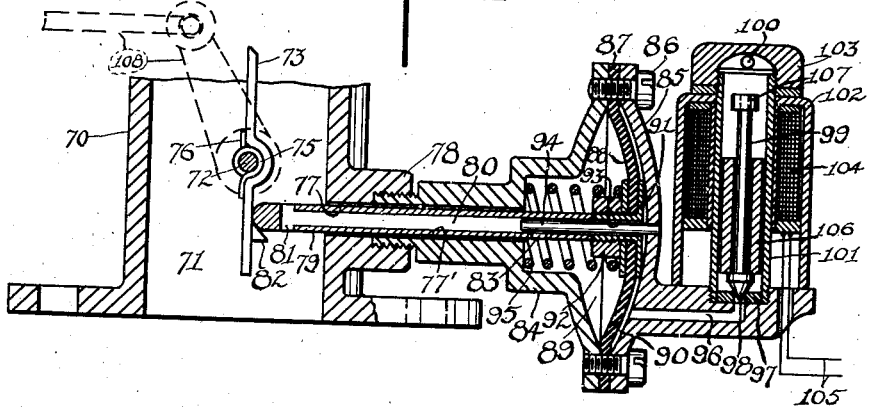
Fig. 3 is a vertical section through the form of invention illustrated in Fig. 2, and showing a fragment of the carbureter outlet neck in which the standard throttle valve is mounted.
Figure 4:
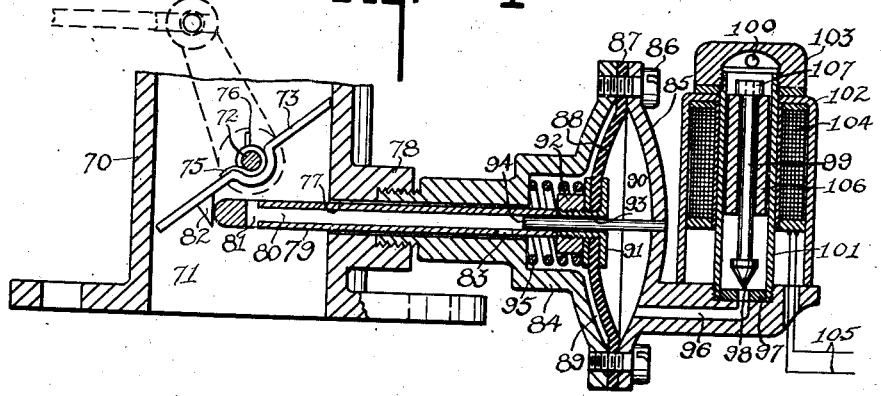
Fig. 4 is a view similar to Fig. 3, but showing the parts in different positions.

In Figs. 2, 3, and 4, I have illustrated an application of the governor mechanism of my present invention to the standard throttle valve of a standard carbureter. The reference numeral 70 indicates the discharge neck of a standard carbureter, said neck being formed to provide a passage 71 traversed by a shaft 72 upon which is loosely mounted the standard throttle valve 73. Said valve 73 is carried upon the shaft 72 by a sleeve 74 (see Fig. 2), and is urged, by a spring 75, into engagement with a stop 76 formed on the shaft 72. It will be seen that the vlave 73 is thus mounted for resiliently-opposed clockwise movement with respect to the shaft 72.

A bore 77 leads radially outward from the passage 71 through a stud 78 preferably formed upon the neck 70, and a plunger 79, similar to the plunger 24, is reciprocably mounted in said bore 77 and in an aligned bore 77' formed in a shell element 84. The plunger 79 is formed with an axial passage 80 terminating in a port 81 positioned within the passage 71, and opening through a radial port 83 into a chamber 89. The end of the plunger 79 disposed within the passage 71 engages the valve 73 at a point offset from the axis of the shaft 72, and said valve 73 is preferably formed, on its engaged face, with an abutment 82 for cooperation with the end of the plunger 79.

The shell element 84 is threadedly secured in the stud 78, and a mating shell element 85 cooperates therewith, said shell elements being formed with peripheral flanges secured together by bolts 86, or the like, and clamping therebetween the peripheral portion 87 of a diaphragm 88. Said diaphragm constitutes a movable wall separating the two variable-volume chambers 89 and 90 of a fluid motor. At its midpoint, the diaphragm 88 is penetrated by a stud 91 clamped in place on said diaphragm by a nut 92. The stud 91 is formed to provide a port 93, the effective capacity of which is materially restricted by a pin 94 carried by the shell element 85. A spring 95 is preferably received within the chamber 89, and biases the diaphragm 88 toward the position illustrated in Fig. 3.

The shell element 85 is formed to provide a passage 96 the outer end of which is surrounded by a valve seat 97 with which cooperates the head 98 of a valve body 99. A port 100 opens to the atmosphere from the interior of a chamber provided by a tubular shell 101 threadedly carried by the element 85 substantially concentric with the valve seat 97. A housing 102 is secured in place about the shell 101 by a cap nut 103 threaded on the upper end of the shell 101, and encloses a solenoid coil 104 connected in a circuit indicated by line wires 105. The armature 106 for said solenoid 104 is slidably associated with the valve body 99 in such a manner that, when the solenoid 104 is energized, said armature will be lifted to strike a dynamic blow against the collar 107 at the upper end of the valve body 99 to lift the valve head 98 off its seat 97.

Suitble speed responsive means is provided for dominating the circuit 105; and the operation of the embodiment of Figs. 2 to 4 is closely analogous to the operation of the structure of Fig. 1, as described above. When the speed responsive means energizes the solenoid coil 104, the valve head 98 will be lifted off the seat 97, and atmospheric air will rush through the passage 96 into the chamber 90 to create therein a pressure enough higher than the pressure existing in the chamber 89 to overcome the tendency of the springs 95 and 75 and to shift the diaphragm 88 toward the left, thereby correspondingly shifting the plunger 79 to swing the valve 73 in a clockwise direction about the axis of the shaft 72. This action will take place even though the shaft 72 is held stationary by the throttle-lever-controlled linkage indicated by the reference numeral 108, since, as has been explained above, the valve 73 may move in a clockwise direction with respect to said shaft, being opposed in such movement only by the resilient force of the spring 75.

When the valve head 98 is returned to the valve seat 97, the pressure within the chamber 90 will gradually be reduced to the value corresponding to the value of the pressure in the chamber 89, whereby the spring 95 will shift the diaphragm 88 back to the position illustrated in Fig. 3, and the spring 75 will cause the valve 73 to follow such movement of the diaphragm 88 until said valve comes into contact with the stop 76, in whatever position that stop may, at that time, occupy.

I claim as my invention:

1. Governor means for an internal combustion engine comprising a valve mounted to control flow of fuel to said engine, a fluid motor operable to actuate said valve and comprising two variable volume chambers separated by a perforated movable wall, conduit means providing communication between one of said chambers and the intake passage of said engine, conduit means providing communication between the other of said chambers and a source of fluid under pressure higher than that existing in said engine intake passage, an electrically operated valve mechanism controlling flow through said last-named conduit means, and means responsive to variations in engine speed and controlling operation of said valve mechanism.

2. The combination with a carbureter element having a fluid passage and a regulating valve therein, of a housing connected to said carburetor element and communicating with said passage, a diaphragm dividing said housing into compartments, means for bleeding fluid through said diaphragm for equalizing pressure on opposite sides thereof, a plunger associated with said diaphragm for moving said fluid regulating valve to closing position, said plunger having its inner end disposed in one of said compartments, having a longitudinal bore terminating at its outer end in a transverse opening open to the interior of said passage, and having an intersecting port adjacent its inner end adapted to cooperate with the wall of said housing for regulating the longitudinal movement of said plunger, said housing having a duct communicating at one end with one of the compartments of said housing and at its other end with the outer atmosphere, and an electrically operated valve member for regulating the passage of air through said duct.

3. Control mechanism for dominating a valve mounted to control fluid flow through a passage, a fluid motor comprising two variable-volume chambers separated by a movable wall, means providing continuous communication between one of said chambers and a region of low fluid pressure, means providing continuous restricted communication between the other of said chambers and said region, a passage connecting said last-named chamber with a source of fluid under higher pressure, valve means controlling fluid flow through said passage, means operatively connecting said movable wall to shift said valve toward closed position upon creation of a pressure in said last-named chamber higher than the pressure in said first-named chamber, means resiliently opposing such movement, and means for shifting said valve means between passage-closing and passage-opening positions.

4. Control mechanism for dominating a valve mounted to control fluid flow throw and passage, a fluid motor comprising two variable-volume chambers separated by a movable wall, means providing continuous communication between one of said chambers and a region of low fluid pressure, means providing continuous restricted communication between the other of said chambers and said region, a passage connecting said last-named chamber with a source of fluid under higher pressure, valve means controlling fluid flow through said passage, means operatively connecting said movable wall to shift said valve toward closed position upon creation of a pressure in said last-named chamber higher than the pressure in said first-named chamber, means resiliently opposing such movement, and means operable upon movement of said wall through a predetermined fraction of its stroke to restrict, without interrupting, communication between said first-named chamber and said manifold.

5. Control mechanism for dominating a valve mounted to control fluid flow through a passage, a plunger operatively associated with said valve, a fluid motor comprising two variable-volume chambers separated by a movable wall, a passage formed in said plunger and providing communication between one of said chambers and a region of flow fluid pressure, said passage including a radially opening port disposed, at times, within said one chamber, said plunger passage further opening into the other of said chambers through a port of smaller capacity than said first-named port, a second passage connecting said last-named chamber with a source of fluid under higher pressure, valve means controlling fluid flow through said second passage, means operatively connecting said movable wall to shift said plunger to move said valve toward closed position upon creation of a pressure in said last-named chamber higher than the pressure in said first-named chamber, and means for shifting said valve means between passage-closing and passage-opening positions.

ARNOLD F. HOPPE.